Oct. 1, 1968    F. DE RAUCOURT    3,403,472
TEMPERATURE CONTROLLED CLOSURE

Filed Nov. 20, 1964    2 Sheets-Sheet 1

Inventor
Francois de Raucourt
By Stevens, Davis, Miller & Mosher
Attorneys

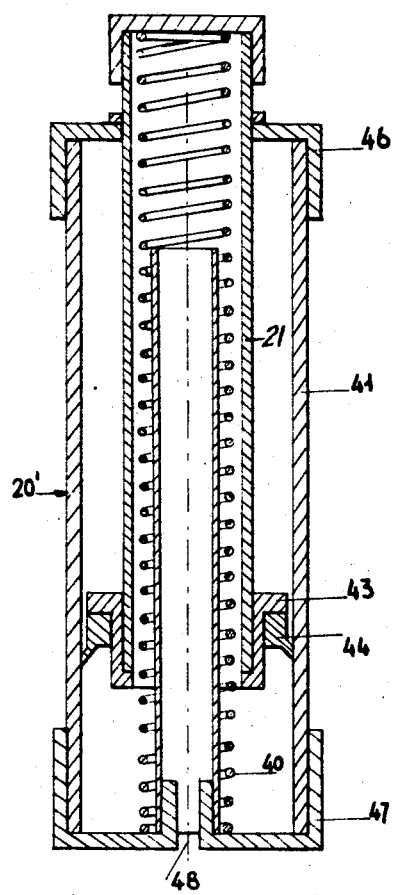
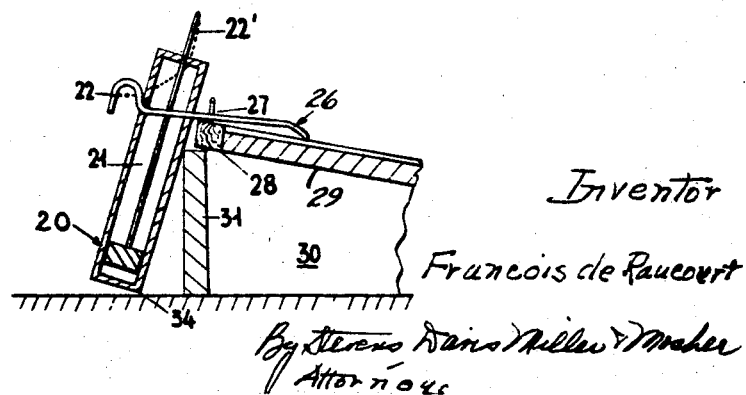

United States Patent Office 3,403,472
Patented Oct. 1, 1968

3,403,472
TEMPERATURE CONTROLLED CLOSURE
Francois de Raucourt, 23 Rue du Colonel Moll,
Paris, France
Filed Nov. 20, 1964, Ser. No. 412,779
Claims priority, application France, Nov. 28, 1963,
955,289
1 Claim. (Cl. 49—31)

ABSTRACT OF THE DISCLOSURE

A combined control valve, controlling the intake and exhaust of pressurized liquid, which is responsive to a temperature detector and operatively connected to actuate jack means to control the opening and closing of a cover, such as the cover of a plant bed box.

This invention relates to the closing and opening of ventilating plants, such as glass covers on greenhouses or frames which cover plant bed boxes. It is known that the opening of these covers must be performed, so as to avoid the temperature which prevails inside the closed space delimited by the frame from reaching an undue value when the sun rays directly strike the glass cover, and that the closing again of the cover must be performed when this temperature decreases under a predetermined value, under the action of external conditions.

A direct combination of a mechanical hoist and a thermostat have been proposed in order to perform these operations automatically. However, the numerous necessary devices which would have to be attached to the thermostat make this solution expensive.

The invention has for its object to secure an automatic operation by remote hydraulically controlled means, from only one temperature detecting device.

The combined valve of the present invention is included in the hydraulic circuit of a jack and is operatively connected with a transducer to open in response to an increase of temperature above a predetermined value and to open in response to a temperature decrease below a predetermined value.

The means for accomplishing for the foregoing objects and other advantages, which will be apparent to those skilled in the art, are set forth in the following specification and claim, and are illustrated in the accompanying drawings dealing with a basic embodiment of the present invention. Reference is made now to the drawings in which:

FIGURE 2 is a sectional view of the jack symbolically represented in association with the hoist device when the apparatus is in the closed cover position.

FIGURE 5 is a sectional view schematically representing the hydraulic jack of the invention as shown in FIGURES 2 and 3.

Figure 1:
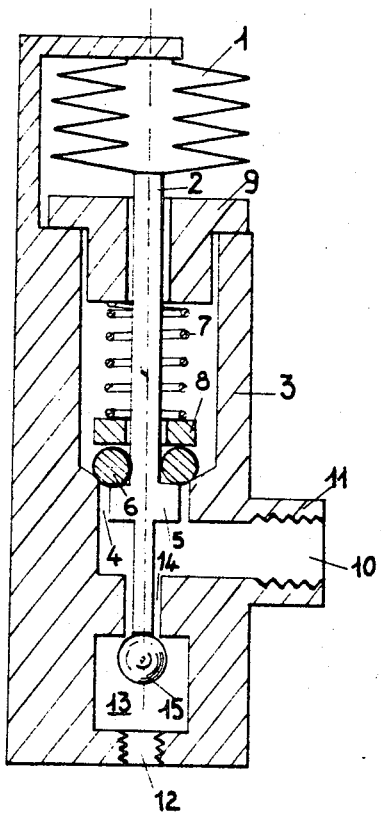
FIGURE 1 is a schematic axial sectional view of the thermo hydraulic transductor.

The thermostatic detector has been denoted by 1 in FIGURE 1. It may consist of a bellows containing a suitable volatile liquid, such as Freon 114.

Any other type of detector, such as a bimetal strip which can displace a rod 2 translationally in response to an increase of the temperature, may be used instead of the illustrated detector.

The rod 2 enters a cylinder 3 the lower part of which is provided with an opening 4. Piston 5 is movably and loosely mounted in opening 4.

The diameter opening 4 is slightly smaller than the interior diameter of the cylinder 3 so as to constitute a seat on which the annular seal 6, which ensures the tightness about the piston 5 is in part pressed.

This seal is constantly biased by a spring 7 which respectively bears on a washer 8 and on a cap 9 which closes the cylinder 3 loosely.

The opening 4 of the cylinder 3 communicates with a chamber 10 which communicates with the main supply pipe of the hydraulic jacks (not represented) through the tubing 11.

Water comes from the pressure source through the tubing 12 and the chamber 13 which communicates with the chamber 10 through a boring 14 through which passes the rod 2 controling a ball 15.

The apparatus operates as follows:

The annular seal 6, which constitutes an obturator, is maintained on its seat by the spring 7, except when temperature causing the rod 2 to retract, causes the piston 5 to lift the seal 6 and thereby allows water to exhaust.

When the temperature increase allows the rod 2 to act on the ball 15, this ball is lifted from its seat and consequently allows water under pressure into the chamber 10 and the feed of the jacks is consequently secured.

The dimensions of the rod 2 and the position of the piston 5 on this rod are rated so as to allow a convenient temperature range during which the pressure will be maintained in the pipe 10.

Preferably, these dimensions will be adjustable, so as to control the temperature range as desired.

Figure 4:
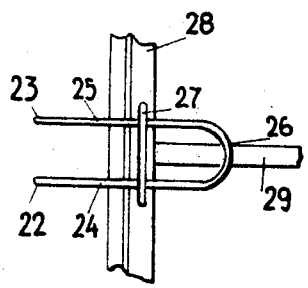
FIGURE 4 is a view of a particular of the hoist device.
Figure 3:
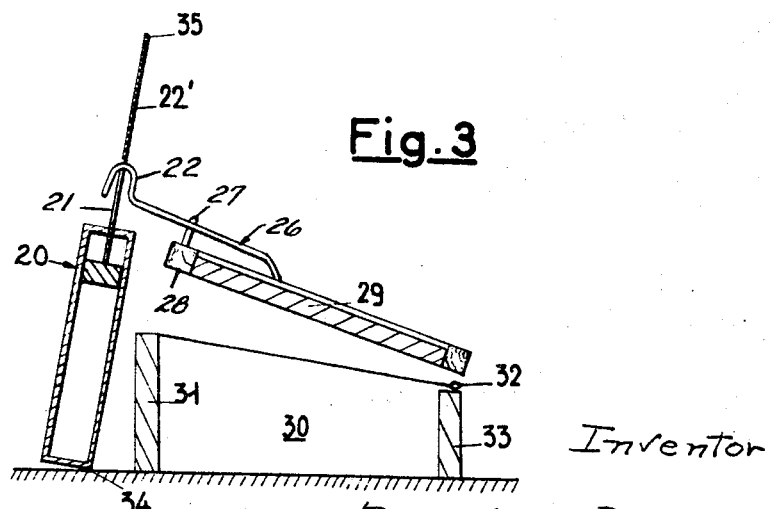
FIGURE 3 is a view corresponding to FIGURE 2 when the apparatus is in the opened cover position.

The hydraulic jack, symbolically represented in FIGURES 2 and 3 and schematically represented in FIGURE 5, is generally designated by 20; the end of its piston rod 21 is provided with a chain 22' which is connected to the hooks 22 and 23 which constitute the respective ends of the branches 24 and 25 of a strap generally designated by 26 (FIGS. 2 to 4).

The chain 22' is slack when the frame is closed, on the contrary, it is tight when the frame is open. The branches of the strap 26 are engaged under the usual handle 27, which is met on any commercially available frame, and is used for hand operation of the same. The cross member of the frame armature on which the handle 27 is positioned is designated by 28. The strap back presses on a cross member 29 which is part of the frame armature or, if such a cross member does not exist, it would be sufficient to adapt or fix one to the other transversal cross members of the armature of the frame. The frame itself is generally designated by 30 in the FIGURES 2 and 3 in which it is only partly represented. The vertical case wall 31 bears the cover in a closed position of the movable frame. The cover is hinged to the rear vertical wall 33 by hinges 32.

The jack itself may be directly supported on the ground at 34 and bears on the wall 31 when it is in its rest position.

As it may be easily seen, when the jack is pressurized, the end 35 of the piston rod 22, the attachment points of the chain to the hooks 22 and 23, and the point 34 are alined, as represented in the FIG. 3. Hence, no hinge is necessary for the jack 20, and, if desired, an elastic collar allowing the jack to be displaced and prevent the jack from falling caused by a shock or the like will be sufficient especially when the jack 20 is located inside the case. A suitable jack 20 is illustrated in FIGURE 5 and may be wholly made of an artificial material such as plastic material, except for the metal spring.

It indeed consists of a body 41 which is made of a section of a tube. The piston 43 together with the piston rod 21 is likely made of artificial material.

The tightness of piston 43 is ensured by a flexible, artificial sealing ring 44 and the upper extremity and the lower extremity of the tube 41 are also closed by two caps 46 and 47. The spring 40 tends to cause the piston rod 21 of the piston to protrude out of the body 41. Pressurized water comes through the pipe 48 which is connected to the pipe 11 of FIGURE 1 through a tubing (not illustrated). A very slow flow will be adjusted, so that the frame itself lifts slowly. The spring 40 tends to make the frame lift easier. As its action decreases progressively when the piston rod 21 extends from the body 41, the frame reaction is a function of the run, and tends to equalize the lift of the various frames which are controlled by the various jacks that the pipe 11 (FIGURE 1) supplies.

From this last point of view, it should be noticed that the effect would be identical whether it tends to make the frame lift easier or with more difficulty.

Practically, the use of two springs one of which facilitates the lift at the beginning of the run, the other one opposing the lift at the end of the run, will be beneficial.

It is to be noticed that, according to the jack arrangement, freezing effects can be contended by means of compressible material or of an anti-freeze, the density of which is lower than the density of water.

What I claim is:

1. In combination with a container including a closing cover, a temperature responsive actuation system operatively connected to selectively open and close said cover, comprising temperature responsive means, fluid operated jack means operatively connected to said cover, valve means, fluid source means, said valve means being operatively connected to selectively connect said jack means to said fluid source and to exhaust, said valve means being responsive to said temperature responsive means, and said valve means comprising a T-shaped cylindrical housing, one arm of the cross bar portion of said housing having a restrictive portion therein at the inner end thereof adjacent the depending portion, piston means mounted for sliding movement within said restrictive portion, first piston rod means operatively connecting said piston to said temperature responsive means, ball valve means mounted within the opposite portion of said cross bar member, a second piston rod means operatively connecting said piston to said ball valve means, said opposite portion of said cross bar being connected to a source of fluid under pressure, said depending portion of said T-shaped housing being connected to said jacks, whereby movement by said temperature responsive member actuates said ball valve to selectively connect said hydraulic jacks to said source of pressure.

References Cited

UNITED STATES PATENTS

| | | |
|---|---|---|
| 589,603 | 9/1897 | King. |
| 1,972,908 | 9/1934 | Shaw. |
| 3,209,482 | 10/1965 | Kuzma. |

DAVID J. WILLIAMOWSKY, *Primary Examiner.*

J. KARL BELL, *Assistant Examiner.*